United States Patent Office 3,350,216
Patented Oct. 31, 1967

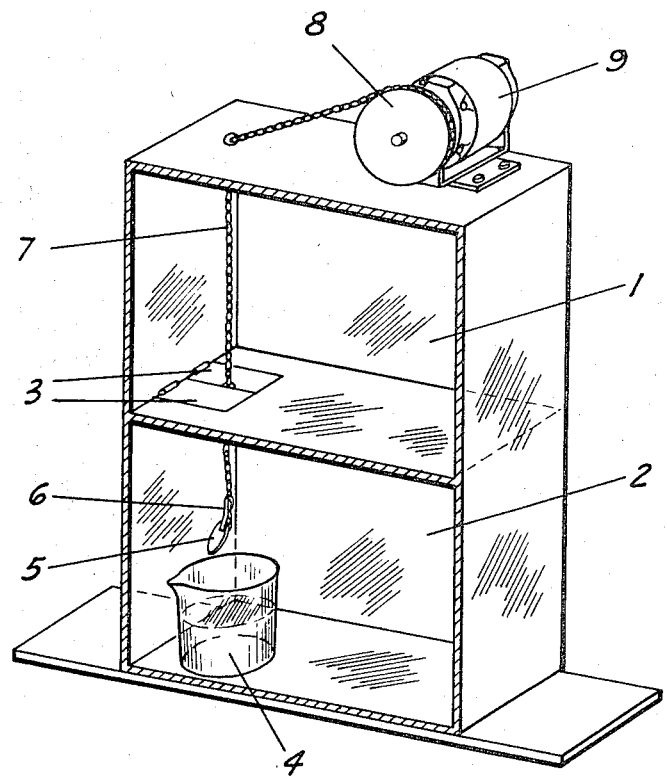

3,350,216
HYDROPHILIC CONTACT LENS AND METHOD
OF MAKING SAME
Donald E. McVannel, Merrill, James L. Mishler, Chesaning, and Keith E. Polmanteer, Midland, Mich., assignors to Dow Corning Corporation, Midland, Mich., a corporation of Michigan
Filed May 11, 1964, Ser. No. 366,536
3 Claims. (Cl. 117—47)

ABSTRACT OF THE DISCLOSURE

Silicone rubber is rendered hydrophilic by (1) dipping it into a solution of titanate of the formula $Ti(OR)_4$ wherein R is an alkyl group of 2 to 4 carbon atoms, (2) allowing the rubber to dry, and (3) immersing the rubber in water. When the silicone rubber is a lens it is also extracted in hot water after the drying step.

---

This invention relates to a method for making silicone rubber and in particular silicone rubber contact lens hydrophilic and to lens made by this process.

The first contact lenses were made well over a hundred years ago. As their name suggests, contact lenses are designed to be worn against the eye. The first lenses were made of glass. With the development of plastics, these new materials soon almost completely replaced glass as lens materials. Today polymethyl methacrylate is the most commonly used plastic for making contact lenses. Further scientific developments are now pointing to the use of silicone rubber for making contact lenses—see, for example, British Patent 922,871, published Apr. 3, 1963.

The various advantages of contact lenses over conventional spectacles are well known. One of the major causes of discomfort when wearing contact lenses is, however, the development of dry spots on the eye. Dry spots are caused by a lack of tears * on the eye and produce a subjective feeling of burning and stinging. (An identical situation is created when one removes tears from the eye by excessive rubbing with the hand or fingers.) The lack of tears on the eye between the lens is usually caused by the hydrophobic nature of the lens material. This is particularly a problem with the plastic (polymethyl methacrylate) and silicone rubber lenses. The hydrophobic nature of the lens makes it extremely difficult, if not impossible, to maintain the integrity of the film of tears on the eye and in particular on the cornea. Even more important than the fact that contact lens can best be tolerated when there is a continuous flow of tears between the lens and eye, is the fact that the tears play an essential part in the nutrition and metabolism of the eye and hence interruption of the flow of tears for any extended period of time could cause eye damage.

One of the ways of overcoming the above disadvantage of contact lenses is to wear them for short periods of time only, allowing adequate time between wearings for the replenishing of the film of tears and for the eye to return to a normal condition. Some attempts have also been made to extend the wearing time of contact lenses by vacuum deposition of a film on the surface of the lens to render the lens hydrophilic.

Another technique, and probably the most widely used today for hydrophilizing lenses, is the use of surfactants. Benzalkonium chloride (also known as zephiran chloride), sodium lauryl sulfate and commercial household detergents are among the surfactants that have been and are being employed. The lenses are soaked in surfactant solutions, such as by placing the lenses in the solution overnight, in hopes of rendering the surface of the lens hydrophilic. While wetting action can sometimes be achieved with these agents, their action is rapidly dissipated as the agent is washed away from the lens by the flushing action of the tears. Moreover, these agents do not belong in the human eye because they are irritants and sensitizers and thus can cause as much discomfort and damage as the lens per se.

Still another method tried for producing wettable or hydrophilic surfaces on methacrylate contact lenses consists of the formation of an inorganic film on the lenses by dipping them into a solvent solution of a tetraalkyltitanate and then allowing the titanate to hydrolyze on the lens surface under controlled humidity conditions. This method is described in the U.S. Department of Commerce, Office of Technical Services bulletin AD 257,290 (1961).

As a general rule, wetting agents and other materials used to treat methacrylate lenses to make them hydrophilic are never useful to render silicone rubber lenses hydrophilic. For example, a wetting agent useful for treating methacrylate lenses washes off a silicone rubber lens when it is dipped in water.

It is an object of this invention to provide a method for treating silicone rubber contact lens hydrophilic and thus making the lens capable of being worn for extended periods of time with greater comfort than heretofore possible. It is also an object of this invention to provide silicone rubber lenses treated by the process of this invention which have permanent hydrophilicity. Still another object is to provide a method for treating silicone rubber to render it hydrophilic. Other objects and advantages of this invention will be apparent from the following description, examples and claims.

In addition to rendering silicone rubber lenses hydrophilic, the process can be used to render any silicone rubber hydrophilic. Such rubber is useful, for example, in making membranes for blood oxygenators, which membranes would have better oxygen and carbon dioxide exchange.

More specifically, this invention relates to a process for treating a silicone rubber lens to render it hydrophilic comprising the steps of (1) dipping the lens at least once into a solution of a titanate having the formula $Ti(OR)_4$, wherein R is an alkyl group containing 2 to 4 carbon atoms,
(2) allowing the lens to dry,
(3) subjecting the lens to an extraction in hot water, and
(4) immersing the lens in cold water.

This invention also relates to a silicone rubber lens treated by the above process.

Silicone rubber lenses are press-molded in smooth surfaced contact lens molds. The pressure and temperature employed during molding are normally about 400 to 500 pounds per square inch and about 150° C., respectively. The molding time varies according to the vulcanizate used. Best release of the lens from the mold is obtained by the use of a fluorocarbon mold release agent and removing the lens while hot. The molded lenses are oven cured for about two hours at about 150° C. after their flash has been removed.

Next, the lenses are preferably subjected to an extraction in a refluxing solvent. This is done as a precautionary measure to remove trace amounts of degradation products of the catalyst used to cure the silicone rubber and to remove any fluid polymeric materials that might be in the rubber. This step can be carried out convenient-

---

* The term "tears" as used herein is synonymous with terms such as "lacrimal layer" and "precorneal film" since differentiation between them in contact lens work is not significant and because the term "tears" conveys the intended concepts to the layman as well as to those skilled in the art.

ly in a Soxhlet extractor employing any pure solvent for the polymer system. Benzene and hexane have both been found to be among the preferred solvents to be employed in this step. An extraction time of about six hours has proved to be very satisfactory. After this extraction, the lenses are allowed to dry overnight. The lenses are then washed with a detergent, mechanical rubbing working most satisfactorily, and rinsed. A 1% aqueous solution of the sodium salt of an alkyl aryl polyether sulfonate surfactant, followed by rinsing in isopropanol and water and then air drying is very effective and satisfactory. Any detergent can be employed so long as it has no harmful effect on the silicone rubber or it does not leave a residue on the lens that cannot be easily removed, as by rinsing. In a like manner, other solvents can be used to rinse the lens after cleaning.

During the cleaning and subsequent treating processes, care should be taken not to handle the lenses with the fingers. Chemically cleaned forceps should be used during handling. Equipment constructed from stainless steel screen is recommended for handling the lenses during oven curing, extraction, air drying, and the other steps. Good, reproducible treatments can be obtained easily as a result of careful handling.

Once the lens has been cleaned and dried it is dipped into a solution of a titanate. Any titanate having the formula $Ti(OR)_4$, wherein R is an alkyl group containing 2 to 4 carbon atoms, can be employed. Thus, R can be an ethyl, propyl, isopropyl, n-butyl, isobutyl, secondary butyl or a tertiary butyl group. The alkyl groups in any titanate can all be the same or they can be different. The preferred titanate is tetraisopropyl titanate. The tetraethyl titanate is less preferred because of its more rapid hydrolysis rate whereas the tetrabutyl titanates are less preferred because of the lower volatility of the alcohols produced upon hydrolysis. The solution of the titanate is prepared in any relatively pure solvent for the polymer system used to make the lens. Benzene, toluene, n-hexane and isopropanol are examples of suitable solvent. Hexane and benzene are the preferred solvents. For best results, the solvent employed should be volatile, and have no harmful effect on the titanate or the lens material. The solvent should also be completely free of impurities and water. While mixtures of solvents can be used, sometimes advantageously, generally they are not preferred.

The amount of titanate employed in the solution can vary considerably. Generally, 1 to 10% by weight of the titanate is employed with 3 to 8% being preferred. The exact concentration used is dependent, at least to some extent, on the exact treating procedure one chooses to use. For example, if one chooses to use a single dip process, then a higher concentration of the titanate in the solution will usually be necessary to get good treatment of the lens whereas if one chooses to use a multiple dip process a lower concentration of the titanate in the solution can usually be used and good treatment of the lens still obtained. For best results, it is preferred that a freshly prepared titanate solution be employed, that is, it is preferred that the titanate solution is used on the same day that it is prepared. The preferred method of treatment at this time consists of a single dip in a 6% titanate solution.

After the lens has been dipped in the titanate solution, it is allowed to dry. During the drying, the titanate hydrolyzes and the solvent evaporates. When a multiple dip process is used, the lens is allowed to dry after each dip. While no special apparatus or atmosphere is necessary for carrying out the dipping of the lens, it is preferable to carry out the dipping process in a controlled humidity atmosphere. While the relative humidity of the atmosphere employed can vary widely, say from 1 to 50% at 25° C., it is preferred that the relative humidity be within the range of 5 to 20%. Generally speaking, a drying interval of about 5 minutes can be used between dips in the humidity controlled atmosphere. After the final dip and drying, it is preferable to then allow the lens to stand exposed to normal atmospheric conditions for an additional period of time to permit further hydrolysis of the titanate. Generally, a period of about two hours is satisfactory.

After the standing period it is necessary to subject the treated lens to a final extraction in hot water. This final extraction is preferably done in refluxing distilled water. This step is believed to be necessary to insure complete hydrolysis of the titanate and to remove any hydrolysis products. An extraction time of about two hours has proven satisfactory. Following this extraction the lenses are immersed in cold, preferably distilled, water to start them wetting. Preferably, the lenses are mechanically rubbed to initiate wetting prior to being immersed. Rubbing of the lens can be done between lens paper wet with distilled water or between solvent cleaned fingers. Rubbing of the lens should be done only when the lens are wet with water and never while the lens are dry.

By extracting the lens in "hot" water it is meant that the water be hot enough to insure complete hydrolysis of the titanate on the lenses. As indicated above, the extraction is preferably done in refluxing (boiling) water. By immersing the lens in "cold" water it is meant that the water is sufficiently cooler than the water used for extracting the lens to cause the lens to start wetting. Water at room temperature, i.e., at the temperature of tap water, has been found to be satisfactory.

In order that those skilled in the art can better understand how the present invention can best be practiced, the following examples are given by way of illustration and not by way of limitation.

All percents referred to herein are by weight and all relative humidities measured at 25° C. unless otherwise specified.

The treatment of this invention can be carried out without the use of any special apparatus. However, for best results it may be desirable to employ special apparatus or specially designed rooms or buildings such as will provide controlled humidity atmospheres.

In the examples below the treatment of the lens was accomplished in a specially designed dipping apparatus. This apparatus is illustrated in the drawing. Referring now to the drawing, which is a front cut away view of the apparatus, the apparatus consists of two vertically arranged chambers. The top chamber 1 is used for the loading and unloading of the lens, while the treatment (dipping and initial drying) is done in the controlled humidity bottom chamber 2. The chambers are completely separated except for a set of trap doors 3 through which the lens 5 is lowered into the bottom chamber 2 for treatment. Access to each of the chambers can be had through doors not shown. Humidity is controlled by a purge of air passed through one or more columns of a drying agent (not shown), such as Drierite, attached to the back of the apparatus. The humidity in the bottom chamber 2 can be measured by placing a hygrometer (not shown) in the chamber. A dish 4, or other suitable container, containing the titanate solution is placed in the bottom chamber 2. During treatment, the lens 5 is placed in a gold clamp 6 attached to a gold chain 7 which in turn is attached to a pulley 8 driven by a constant speed motor 9, the motor and pulley being situated on top of the apparatus. The placing of the lens 5 in the clamp 6 is done in the top chamber 1. The lens 5 is manually lowered into the titanate treating solution contained in dish 4, the interchamber trap doors 3 closed and the motor started. The chain 7 is wound on pulley 8. In the drawing the lens 5 is shown drying in bottom chamber 2 after it has been withdrawn from the titanate treating solution. The use of a constant speed motor effects an even withdrawal of the lens 5 from the titanate solution which results in a uniform hydrophilic treatment of lens 5. After treatment of lens 5 is completed in bottom chamber 2, the lens 5 is then manually raised into top chamber 1 through trap doors 3, removed from clamp 6, placed in a contact lens case (not shown) and left in top chamber 1 for an additional period of time to dry.

*Example 1*

Silicone rubber contact lenses were press molded in a highly polished steel contact lens mold for about 15 minutes at about 150° C. and 500 pounds per square inch of pressure. The lenses were hot released using a fluorocarbon release agent. The lenses were given a two hour oven cure at 150° C. after first removing their flash. The lenses were then placed in stainless steel screen holders, the holders placed in a Soxhlet extractor, the lenses subjected to a six hour solvent extraction in refluxing hexane, and then allowed to dry overnight. The lenses were then washed with mechanical rubbing in a 1% aqueous solution of the sodium salt of an alkyl aryl polyether sulfonate, rinsed in isopropanol and distilled water and then air dried. The lenses were given one dip in a 6% solution of tetraisopropyltitanate in hexane employing the apparatus described above. A withdrawal rate of four inches per minute was used. After a lens was dipped in the titanate solution and withdrawn, it was allowed to dry for five minutes in a 10–15% relative humidity atmosphere. Then the lens was raised manually into the upper chamber of the apparatus, placed in a polyethylene contact lens case and left open in the upper chamber for an additional two hours drying time. Then the lenses were given a two hour extraction in refluxing distilled water, then rubbed between lens paper wet with distilled water, and finally immersed in cold distilled water. The lenses were found to exhibit excellent wetting after three days immersion. The lenses were checked for rewettability by putting them on a stainless steel screen and placing them in the upper chamber of the apparatus to dry. After three days drying time, the lenses were grasped at their outer edges with forceps, immersed in and immediately removed from cold distilled water. The lenses showed excellent rewettability.

*Example 2*

Eight silicone rubber contact lenses were molded, solvent extracted, washed and rinsed as in Example 1 except that refluxing benzene was used for the solvent extraction. The lenses were treated (3 dips) with a 3% solution of tetraisopropyltitanate in hexane using the procedure of Example 1. After treatment, four of the lenses were given a two hour extraction in refluxing benzene followed by a two hour extraction in refluxing distilled water. The other four lenses were given a two-hour extraction in refluxing distilled water only. After their final extractions, all of the lenses were rubbed between lens cleaning paper wet with distilled water and then immersed in cold distilled water for ten days. After this time, all of the lenses were wetting excellently.

*Example 3*

Silicone rubber contact lenses were molded, solvent extracted, washed and rinsed as in Example 1. 2%, 4% and 8% solutions of tetraisopropyltitanate in hexane were prepared. The lenses were given one dip in one of these solutions following the procedure of Example 1. After treatment, the lenses were dryed, extracted, rubbed and immersed in distilled water as in Example 1. After a few days immersion, the lens were not wetting satisfactorily so they were removed from the water and rubbed between a thumb and forefinger which had been cleaned in acetone and isopropanol. Immediately after rubbing, the lenses were reimmersed in the water and found to exhibit good to excellent wetting within a few days.

*Example 4*

Silicone rubber contact lenses were molded to proper optical prescription correction as in Example 2 and then the edges were trimmed and ground smooth. The lenses were solvent extracted, washed, rinsed and treated as in Example 2. After treatment the lenses were extracted two hours in refluxing benzene, then extracted two hours in refluxing water and finally immersed in cold distilled water over the weekend. Upon removal from the water the lenses were found to be wetting excellently. The lenses were then rubbed between lens paper wet with distilled water. One of these lens was worn for 4½ hours. Wettability of the lens while on the eye was observed with a magnifying glass and found to be excellent.

*Example 5*

Silicone rubber contact lenses were molded to the desired prescription and the edges were ground and processed as in Example 4 except that a 2% solution of the titanate was used. Following the two hour extraction in hot water, the lenses were immersed in cold water overnight. The next morning the lenses were rubbed between lens paper wet with water and then reimmersed in water for about three hours. The lenses were then rubbed between solvent cleaned thumb and forefinger and again reimmersed in water overnight. One of the lenses was worn on seven consecutive days and showed excellent wetting and comfort. In the table below the care given the lens between wearings as well as the approximate wearing time is set forth. The wearing times are continuous hours of wear. Unless otherwise indicated, the lens was placed in distilled water between wearings.

| Day | Hours Worn | Care |
| --- | --- | --- |
| 1st | 11 | Removed from distilled water and put in eye. |
| 2d | 12¼ | Cleaned with commercial lens cleaning solution before put in eye. |
| 3d | 12 | Removed from distilled water and put in eye. |
| 4th | 12¼ | Cleaned with lens cleaning solution before put in eye, upon removal placed in lens cleaning solution for overnight soak. |
| 5th | 16 | Removed from solution and put in eye. |
| 6th | 17 | Removed from distilled water and put in eye, upon removal placed in lens cleaning solution for overnight soak. |
| 7th | 15 | Removed from solution and put in eye. |

*Example 6*

When tetraethyltitanate, diethyldipropyltitanate or tetrabutyltitanate is substituted for the titanate in Examples 1 or 3, equivalent results are obtained.

*Example 7*

When silicone rubber contact lenses are dipped into a 5% solution of tetraethyltitanate, tetraisopropyltitanate or triethyl-t-butyltitanate in hexane, allowed to dry, subjected to an extraction in hot water, and then immersed in cold water (that is, water at room temperature), the lenses become hydrophilic and exhibit good wetting.

*Example 8*

When toluene, benzene, n-octane or isopropanol is substituted for the hexane of Example 7, equivalent results are obtained.

*Example 9*

When a sheet of silicone rubber is dipped into a 6% solution of tetraethyltitanate, tetraisopropyltitanate or tetrabutyltitanate in hexane, allowed to dry and then immersed in water, the rubber becomes hydrophilic and the surface of the sheet exhibits good wetting.

That which is claimed is:

1. A process for treating a silicone rubber lens to render it hydrophilic comprising the steps of
   (a) subjecting the lens to a solvent extraction,
   (b) allowing the lens to dry,
   (c) cleaning the lens with a detergent,
   (d) rinsing the lens,
   (e) allowing the lens to dry,
   (f) dipping the lens at least once into a solution of a titanate having the formula $Ti(OR)_4$, wherein R is an alkyl group containing from 2 to 4 carbon atoms, (g) allowing the lens to dry,
(h) subjecting the lens to an extraction in hot water,
(i) rubbing the surfaces of the lens while wet with water and
(j) immersing the lens in cold water.

2. A silicone rubber lens treated by the process of claim 1.

3. A process for treating a silicone rubber lens to render it hydrophilic comprising the steps of
   (a) subjecting the lens to a hexane extraction,
   (b) allowing the lens to dry,
   (c) cleaning the lens with an aqueous solution of the sodium salt of an alkyl aryl polyether sulfonate,
   (d) rinsing the lens in isopropanol and water,
   (e) allowing the lens to dry,
   (f) dipping the lens at least once into a hexane solution of tetraisopropyltitanate containing 3 to 8% by weight of the titanate, the dipping being done in an atmosphere having a relative humidity of 5 to 20% at 25° C.,
   (g) allowing the lens to dry for about five minutes after each dip in the 5 to 20% relative humidity atmosphere and then allowing the lens to dry for about two additional hours under normal atmospheric conditions after the final dip,
   (h) subjecting the lens to an extraction in hot water,
   (i) rubbing the water wet surfaces of the lens to initiate wetting, and
   (j) immersing the lens in cold water.

References Cited

UNITED STATES PATENTS

| | | | |
|---|---|---|---|
| 2,674,743 | 4/1954 | Gaiser et al. | 351—160 X |
| 2,768,909 | 10/1956 | Haslam | 117—33.3 X |
| 2,898,229 | 8/1959 | Herr et al. | 117—147 X |
| 3,228,741 | 1/1966 | Becker | 351—160 |

FOREIGN PATENTS 927,202  5/1963  Great Britain.

OTHER REFERENCES

ERB: "Method for Producing Wettable Surfaces on Contact Lenses by Chemical Formation," March 1961, U.S. School of Aviation Medicine, USAF Aerospace Medical Center (ATC), Brooks Air Force Base, Texas.

MURRAY KATZ, *Primary Examiner.*